June 9, 1959 M. J. HUBERT 2,889,766
TWO-PART BAKING APPARATUS
Filed Aug. 19, 1957 2 Sheets-Sheet 1
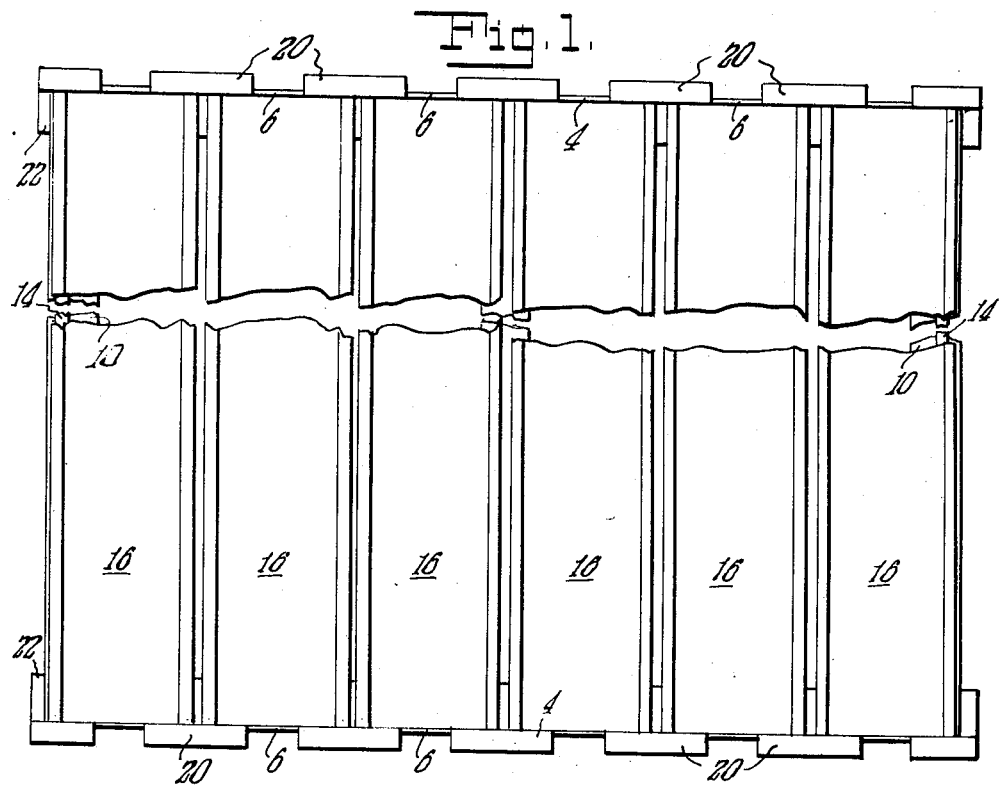
Fig. 1.
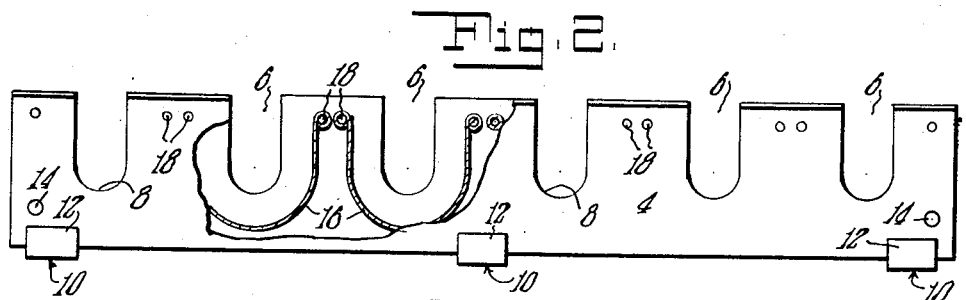
Fig. 2.
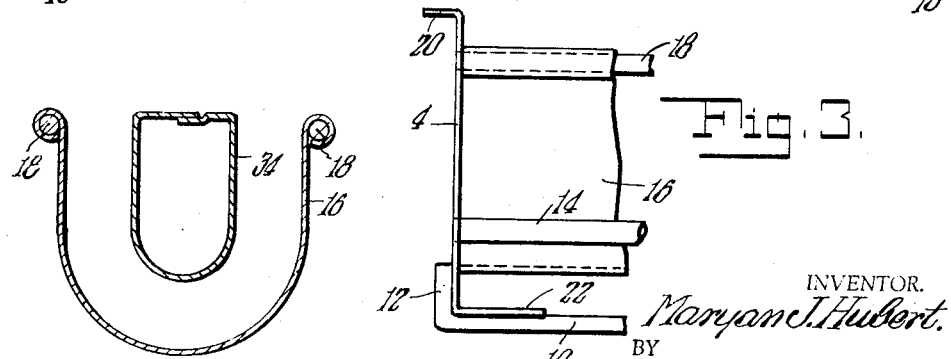
Fig. 3.
Fig. 4.
INVENTOR.
Maryam J. Hubert.
BY
Ross & Ross, Atty.

June 9, 1959
M. J. HUBERT
2,889,766
TWO-PART BAKING APPARATUS
Filed Aug. 19, 1957
2 Sheets-Sheet 2
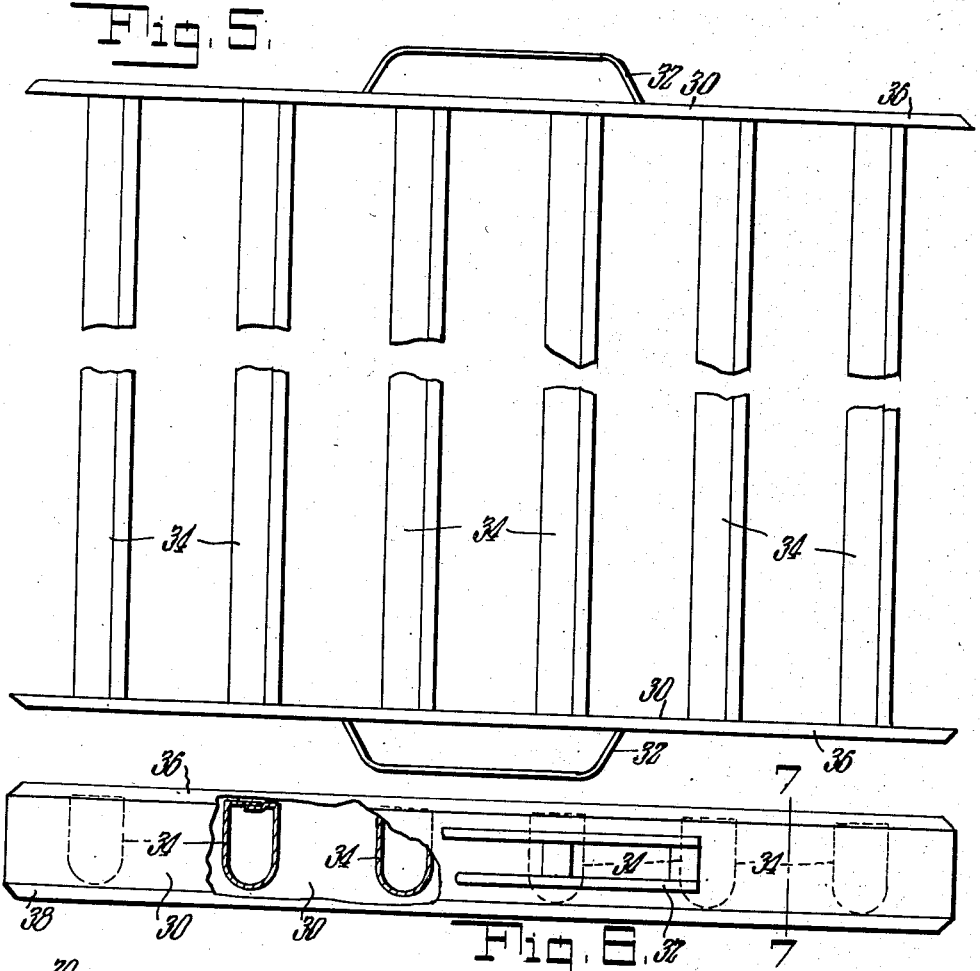
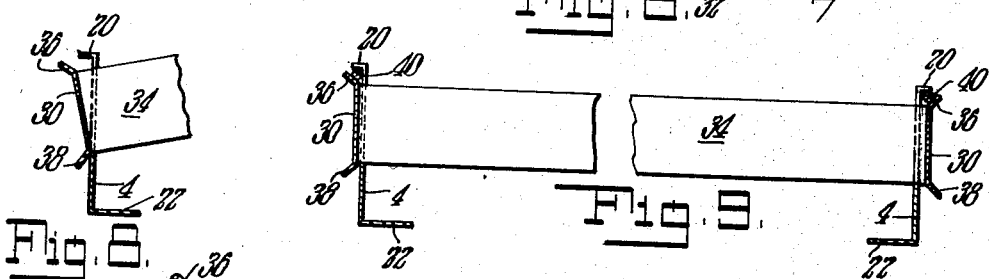
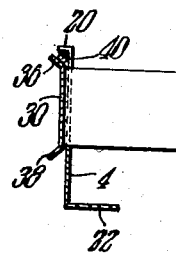
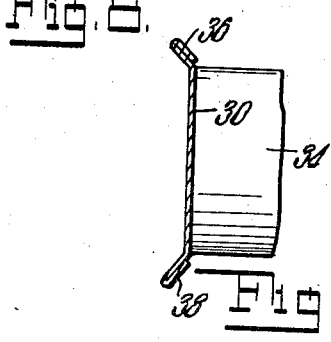
INVENTOR.
Maryan J. Hubert.
BY

United States Patent Office 2,889,766
Patented June 9, 1959

2,889,766
TWO-PART BAKING APPARATUS

Maryan J. Hubert, Easthampton, Mass.

Application August 19, 1957, Serial No. 678,786

1 Claim. (Cl. 99—439)

This invention relates to improvements in baking apparatus, and is directed more particularly to improvements in apparatus for forming and baking elongated roll-like bodies having longitudinal cavities therealong for meat products and the like.

The principal object of the invention is directed to the provision of a two-part baking apparatus having lower and upper members which are easily and readily assembled for a baking operation, and are as readily disassembled upon completion of the baking to facilitate removal of the baked products.

According to novel features of the invention, a lower member is provided with a plurality of transversely spaced elongated channels for dough to be baked. An upper member has elongated core members arranged whereby, in assembled relation of the lower and upper members, the core members are disposed in and spaced from the channels so that elongated bodies are baked which have open slots or grooves along a side thereof, for the insertion thereinto of foods, such as meat products or the like.

Means is provided to releasably lock the upper and lower members in their assembled relation for the baking of the dough so that the baked bodies are uniform in all important respects.

Various changes and modifications may be made in the form of the apparatus without departing from the spirit and scope of the invention which will be described in connection with the accompanying drawings wherein:

Figs. 1 and 2 are plan and end elevational views respectively of the bottom member of the two-part baking apparatus of the invention;

Fig. 3 is an elevational view at a side of one of the end members of the lower member;

Fig. 4 is a transverse sectional view through a channel and a core of the lower and upper members to show their relationship;

Figs. 5 and 6 are plan and end elevational views respectively of the upper member of the two-part baking apparatus;

Fig. 7 is a sectional view on the line 7—7 of Fig. 6;

Fig. 8 is a diagrammatic sectional view through the ends of the upper and lower member to illustrate the assemblage thereof;

Fig. 9 is a longitudinal view through the lower and upper members in assembled relation; and Fig. 10 is a plan view of a locking member of the invention.

Referring now to the drawings more in detail, the apparatus embodying the invention will be fully described.

A lower member, shown in Figs. 1 and 2, has opposite end walls 4 which have spaced therealong downwardly depending slots 6. Said slots have semi-circular bottoms 8, as shown.

Elongated runners or supports 10 have outer upturned ends 12 which are superposed on outer sides of the end walls 4. The ends 12 are secured to the walls 4 in any suitable manner as by welding, riveting or the like.

Elongated tie rods 14 extend between the end walls 4, and have opposite ends secured thereto. The ends of said rods may be disposed in holes of the walls 4, and welded therein.

A plurality of elongated channels 16 extend between the end walls 4 and are disposed around the slots 6. Upper longitudinal edges of said channels 6 are formed around rods 18 which are secured to the end walls 4 as by being welded in holes provided in said walls. The ends of the channels 16 may be secured to the walls 4, if desired, as by welding.

Locking flanges 20 extend outwardly from the upper edges of the walls 4 and between the slots 6 thereof.

Lower flanges 22 extend inwardly from lower edges of said side walls 4, and serve to reinforce and stiffen the structure.

Dough is placed in the channels 16, and the slots 6 of the end walls 4 receive the ends of cores of an upper member to be described.

An upper member, shown in Figs. 5 and 6, has end walls 30 which are provided with handles 32 of any desired form, which handles are secured thereto.

Elongated hollow cores 34 extend between the end walls 30, and have opposite ends secured to said walls, as by welding or the like.

Upper and lower longitudinal edges 36 and 38 of the walls 30 are inclined outwardly relative to said walls, as indicated in Fig. 7.

An elongated lock member is represented by 40 in Fig. 10, and has an angularly disposed manually engageable portion 42.

In assembling the upper member on the lower member, said upper member is tilted, and one end of the cores 34 are inserted in the slots 6 of one end wall of the lower member, see Fig. 8. From this position, the opposite end of the upper member is swung downwardly to enter the opposite ends of the cores in the slots 6 of the opposite end wall 4 of the lower member, as shown in Fig. 9.

The core members 34 of the upper member are of such length, relative to distance between the end walls 4 of the lower member, and the flanges 20 and 36 are so proportioned, that, as the right hand end of the upper member is swung downwardly, the right hand end wall 30 of said member clears the right hand lock flange 20 of the lower member. With the upper member assembled on the lower member, wherein the ends of the core members 34 are in the slots 6 of the lower member, the end walls 30 of the upper member are disposed outside the end walls 4 of the lower member.

A lock member such as 40 may be inserted at opposite ends of the lower and upper members, between the flanges 20 and 36 of said members, to releasably hold the members in assembled relation. Said lock members may be readily withdrawn for separation of the lower and upper members.

Thus there is provided a two-part baking apparatus which is constructed and arranged for heat circulation to accomplish uniform baking, and wherein the upper and lower members may be quickly assembled and disassembled for the removal of baked products having a longitudinal slot with a cross section in the form of a U.

The relation of the cores and channels is shown, in Fig. 4, in assembled relation of the upper and lower members. It will be seen that space is provided between the channels and cores for dough to be baked therein.

The handles are provided for lifting the apparatus with the upper and lower members locked in assembled relation. The handles also facilitate placing the upper member on or removing it from the lower member.

Various changes may be made in the form of the invention without departing from the spirit and scope of the invention.

It is desired to claim and secure the following by Letters Patent of the United States:

Two-part mold apparatus for baking elongated objects of dough having generally U-shaped cross section and being open along upper sides thereof comprising, separate lower and upper members, said lower member including opposite vertical end walls and a plurality of horizontally-spaced elongated members formed in the form of U-shaped channels to have opposite vertical side and concave bottom walls with upper openings therealong and being secured at opposite ends to the end walls, the end walls of said lower member being provided with U-shaped slots depending downwardly from upper edges thereof in register with the channelled members and having opposite side and lower edges spaced uniformly inwardly and upwardly from adjacent sides and bottoms of the channels thereof, the end walls of said lower member being provided at the upper edges thereof between the slots therein with upper locking flanges extending horizontally outwardly therefrom, said upper member including a plurality of horizontally spaced elongated hollow cores and vertically disposed upper end walls secured to opposite ends thereof, with the cores being in cross section in the shape of U's having opposite sides and bottom walls and being of such length and form in cross section that opposite ends thereof are snugly seated in the slots of the opposite end walls of said lower member with the end walls of said upper member disposed outside the end walls of said lower member, the side and bottom walls of the cores being disposed inwardly of adjacent walls of the channels of said lower member to provide U-shaped spaces for dough therebetween open at upper longitudinal sides thereof, upper edges of the upper end walls of said upper member being provided with lower locking flanges inclining upwardly and outwardly relative to the end walls and disposed below the upper locking flanges of the lower end walls of said lower member and providing spaces therebetween, and means including elongated members extending along the spaces between the adjacent locking flanges at opposite ends of said lower and upper members for releasably locking the flanges against displacement of said upper member upwardly relative to said lower member.

References Cited in the file of this patent

UNITED STATES PATENTS

| | | |
|---|---|---|
| 1,738,301 | Kornreich | Dec. 3, 1929 |
| 1,817,690 | Hubert | Aug. 4, 1931 |
| 2,167,038 | Damon | July 25, 1939 |
| 2,252,990 | Smith | Aug. 19, 1941 |
| 2,595,684 | Lyons | May 6, 1952 |

FOREIGN PATENTS

| | | |
|---|---|---|
| 671,589 | France | Sept. 7, 1929 |